(12) United States Patent
Palmowski

(10) Patent No.: US 7,013,782 B2
(45) Date of Patent: Mar. 21, 2006

(54) APPARATUS AND METHOD FOR CUTTING AND STRIPPING COVERING LAYERS FROM A FILAMENTARY CORE INCLUDING BOTH ROTARY AND RECIPROCATING CUTTING BLADES

(75) Inventor: David J. Palmowski, Syracuse, NY (US)

(73) Assignee: Orbital Technologies, Inc., Syracuse, NY (US)

( * ) Notice: Subject to any disclaimer, the term of this patent is extended or adjusted under 35 U.S.C. 154(b) by 59 days.

(21) Appl. No.: 10/788,082

(22) Filed: Feb. 26, 2004

(65) Prior Publication Data

US 2004/0194582 A1    Oct. 7, 2004

Related U.S. Application Data

(60) Continuation-in-part of application No. 10/359,775, filed on Feb. 5, 2003, now Pat. No. 6,840,147, which is a division of application No. 09/640,843, filed on Aug. 16, 2000, now Pat. No. 6,588,302.

(51) Int. Cl.
  *B26D 5/08* (2006.01)
(52) U.S. Cl. ............................ 83/580; 83/596; 83/924; 81/9.51
(58) Field of Classification Search ................ 83/580, 83/596, 924, 947, 598, 530, 646; 81/9.51, 81/9.41, 9.42; 30/90.1–90.3, 90.6–90.8
See application file for complete search history.

(56) References Cited

U.S. PATENT DOCUMENTS

| | | | | | |
|---|---|---|---|---|---|
| 4,250,772 | A | * | 2/1981 | Graber | 81/9.51 |
| 4,441,386 | A | * | 4/1984 | Hara | 81/9.51 |
| 4,619,164 | A | * | 10/1986 | Aikens | 83/200 |
| 4,811,633 | A | * | 3/1989 | Bueschel et al. | 81/9.51 |
| 5,460,069 | A | * | 10/1995 | Sayyadi et al. | 83/171 |
| 5,934,161 | A | * | 8/1999 | Keene | 81/9.51 |
| 6,736,032 | B1 | * | 5/2004 | Hombu | 81/9.44 |

\* cited by examiner

*Primary Examiner*—Allan N. Shoap
*Assistant Examiner*—Omar Flores Sánchez
(74) *Attorney, Agent, or Firm*—George R. McGuire; Bond, Schoeneck & King, PLLC

(57) ABSTRACT

A cutting/stripping apparatus, and methods of operation thereof, which include at least one first blade for rotary motion about the central axis of a multi-layered workpiece, and at least two, second members/blades reciprocally movable along essentially linear axes, toward and away from the one another while remaining equally spaced on opposite sides of the central axis. The general structure of the apparatus may be a single, orbiting blade to provide cutting of the outer layer about its entire periphery and a pair of members movable toward and away from one another to engage the outer layer. The pair of members may have linear, opposed edges, or may have a V-shaped or radiused (curved) cutting edges. Electronic controls and software, together with selective operator inputs which define operation of the apparatus, permit cutting the outer layer of the workpiece by either the rotary blade or the reciprocating blades.

11 Claims, 17 Drawing Sheets

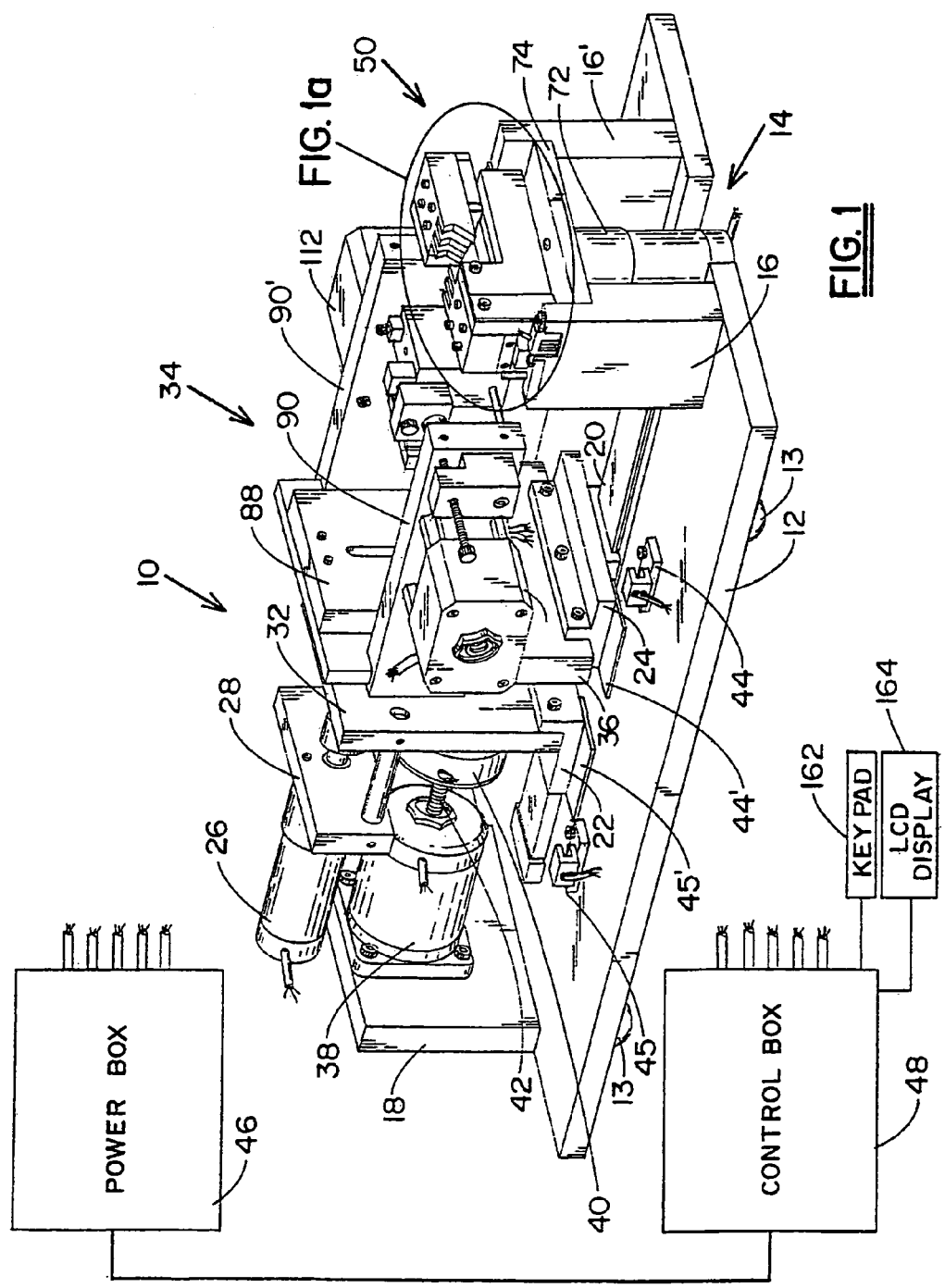

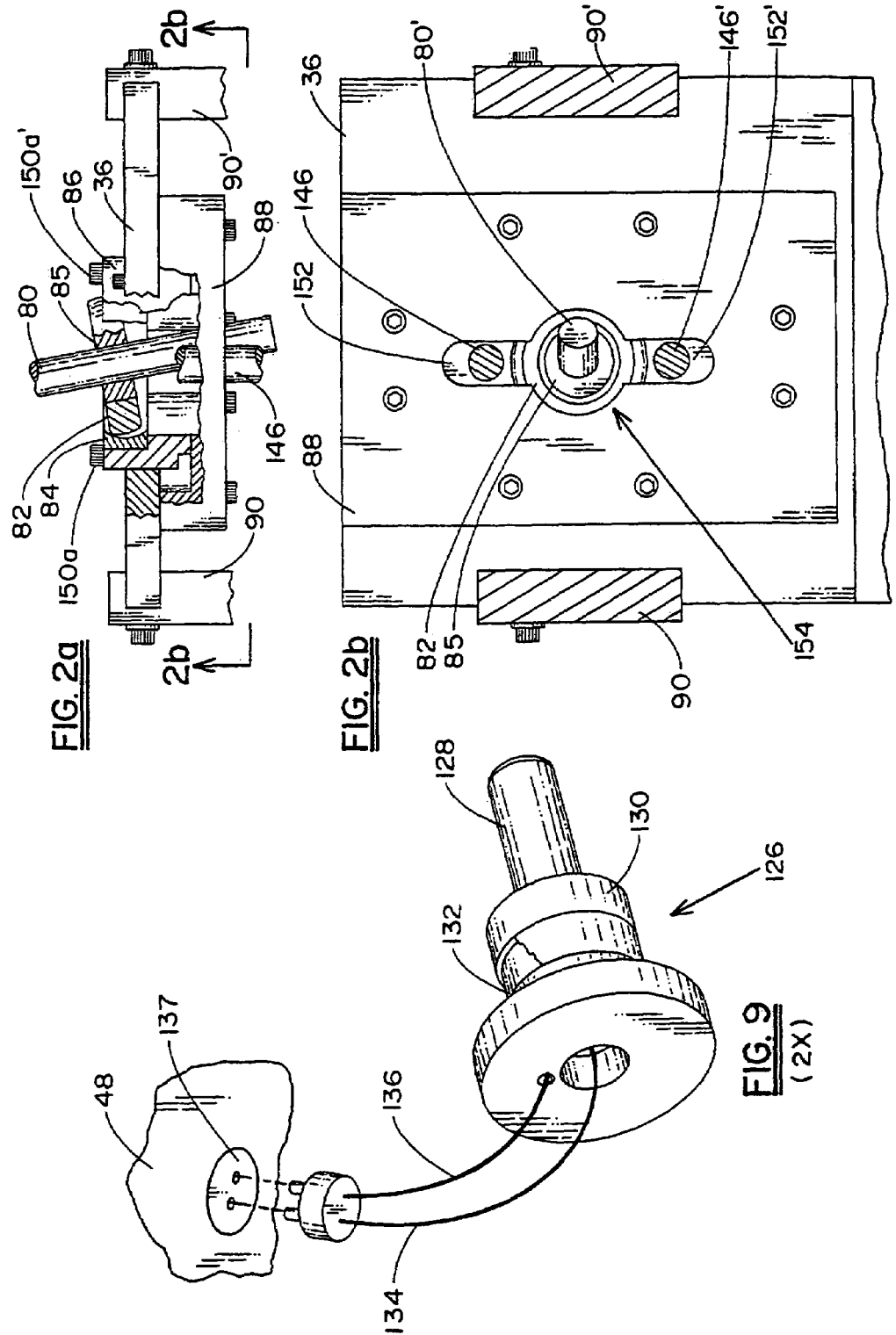

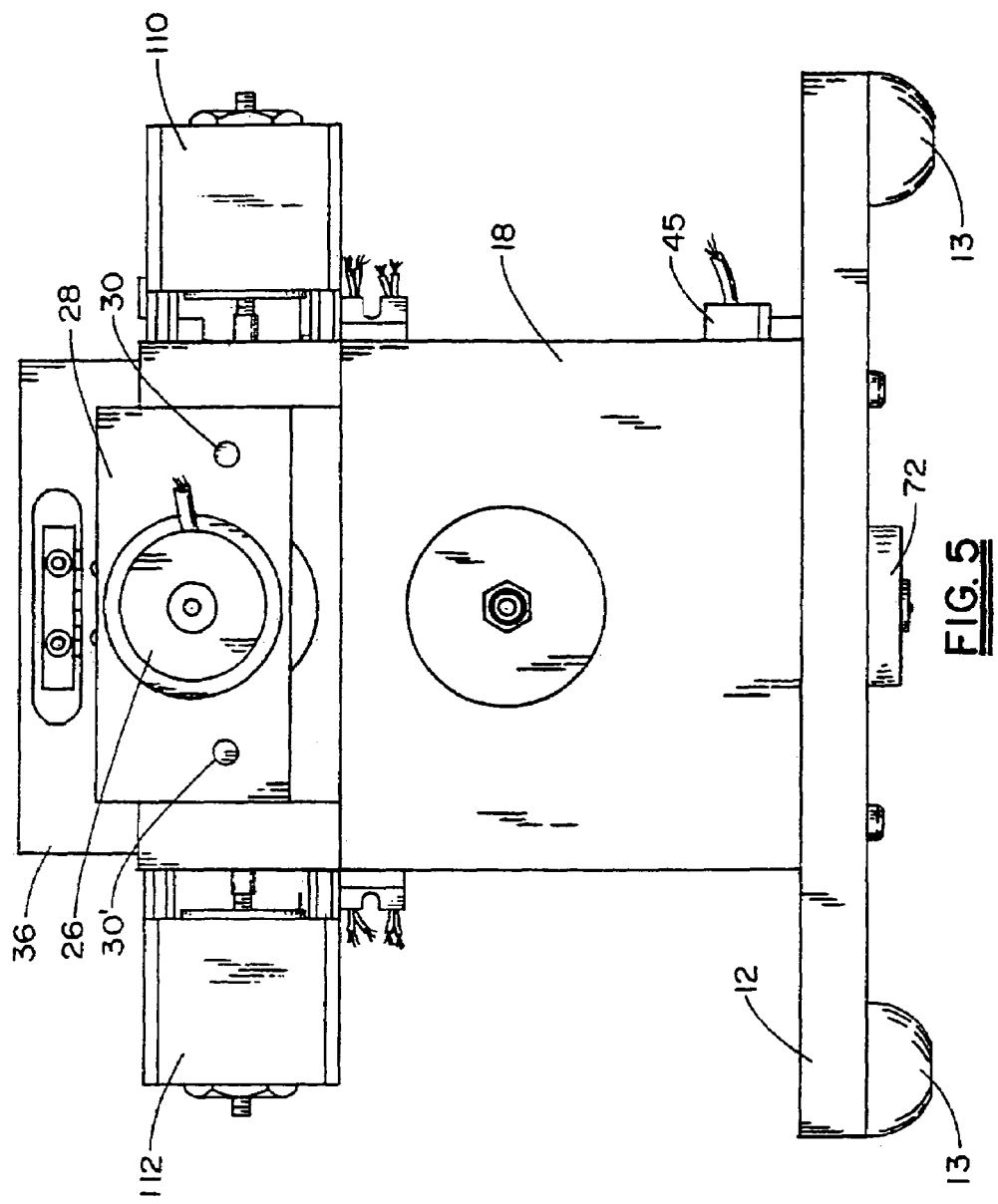

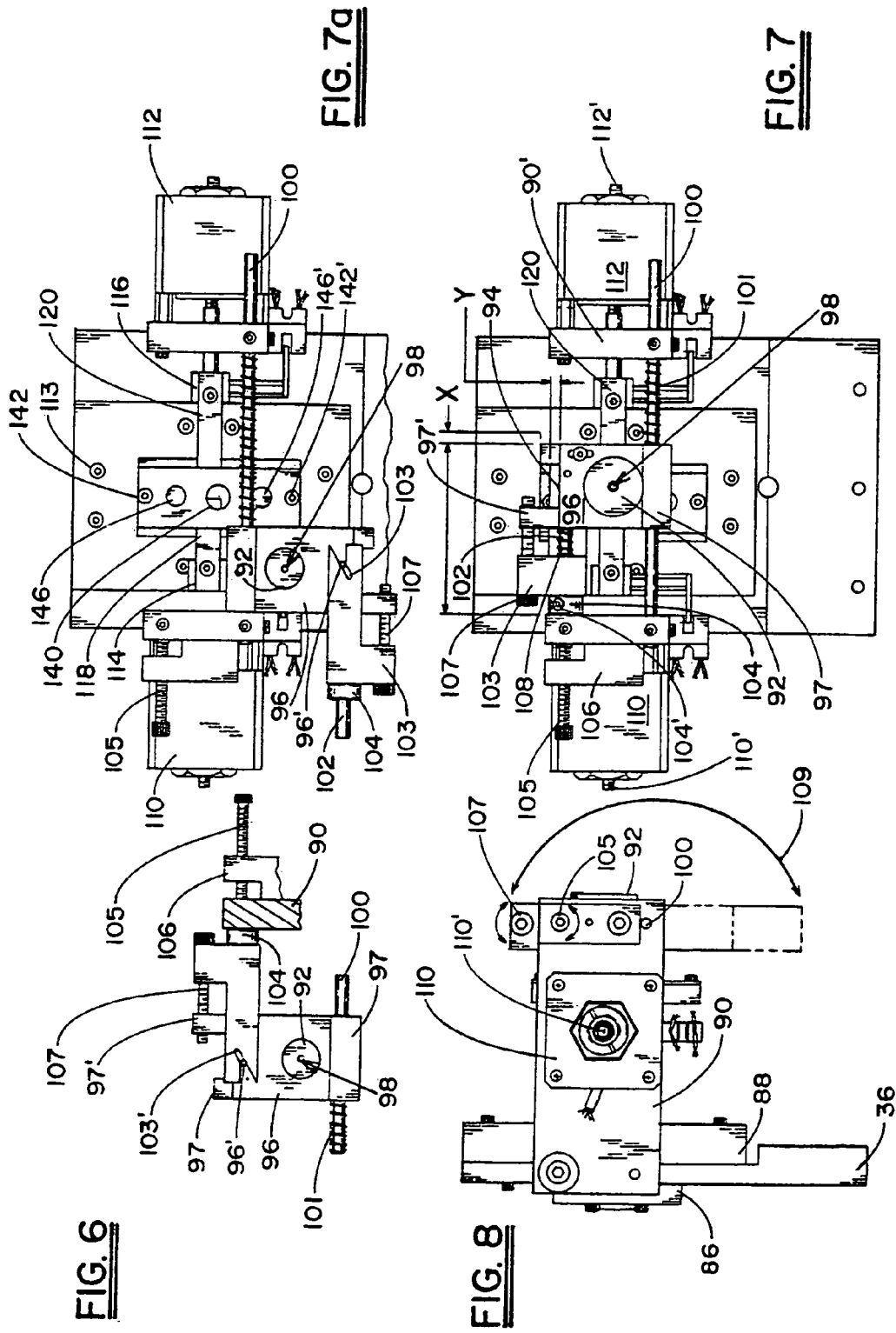

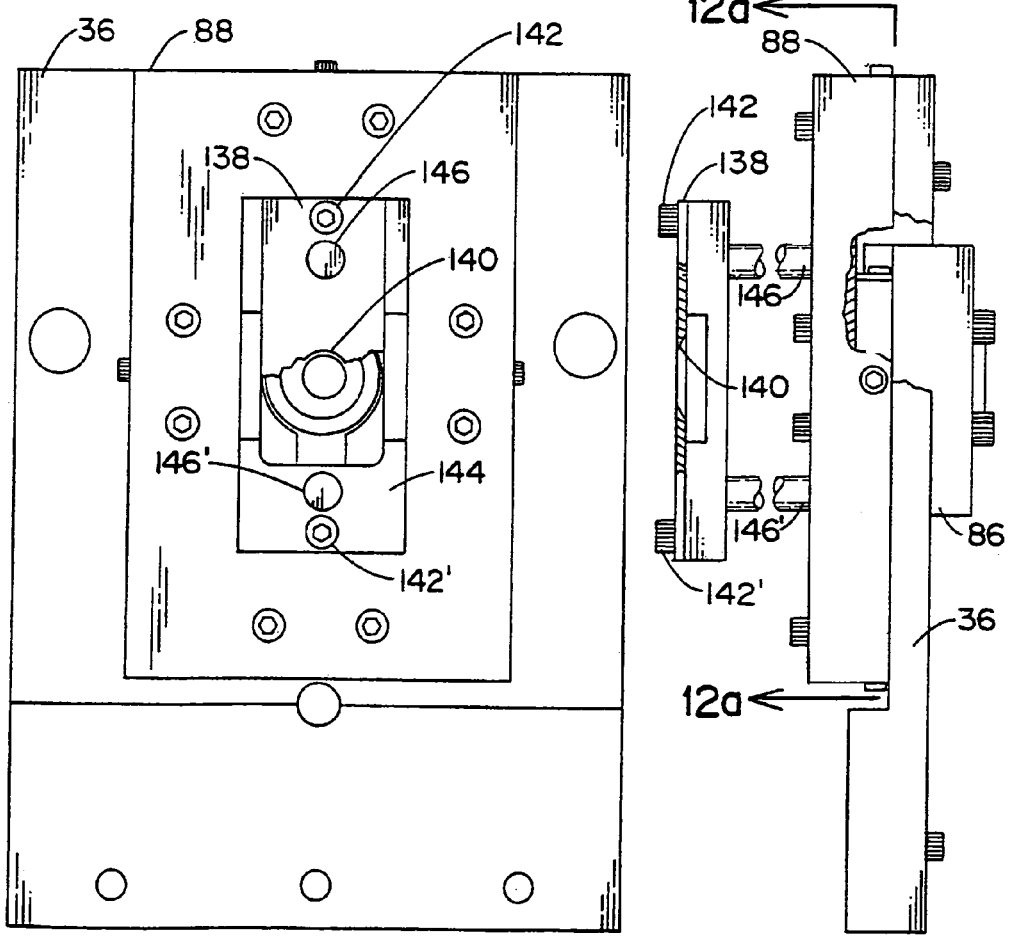

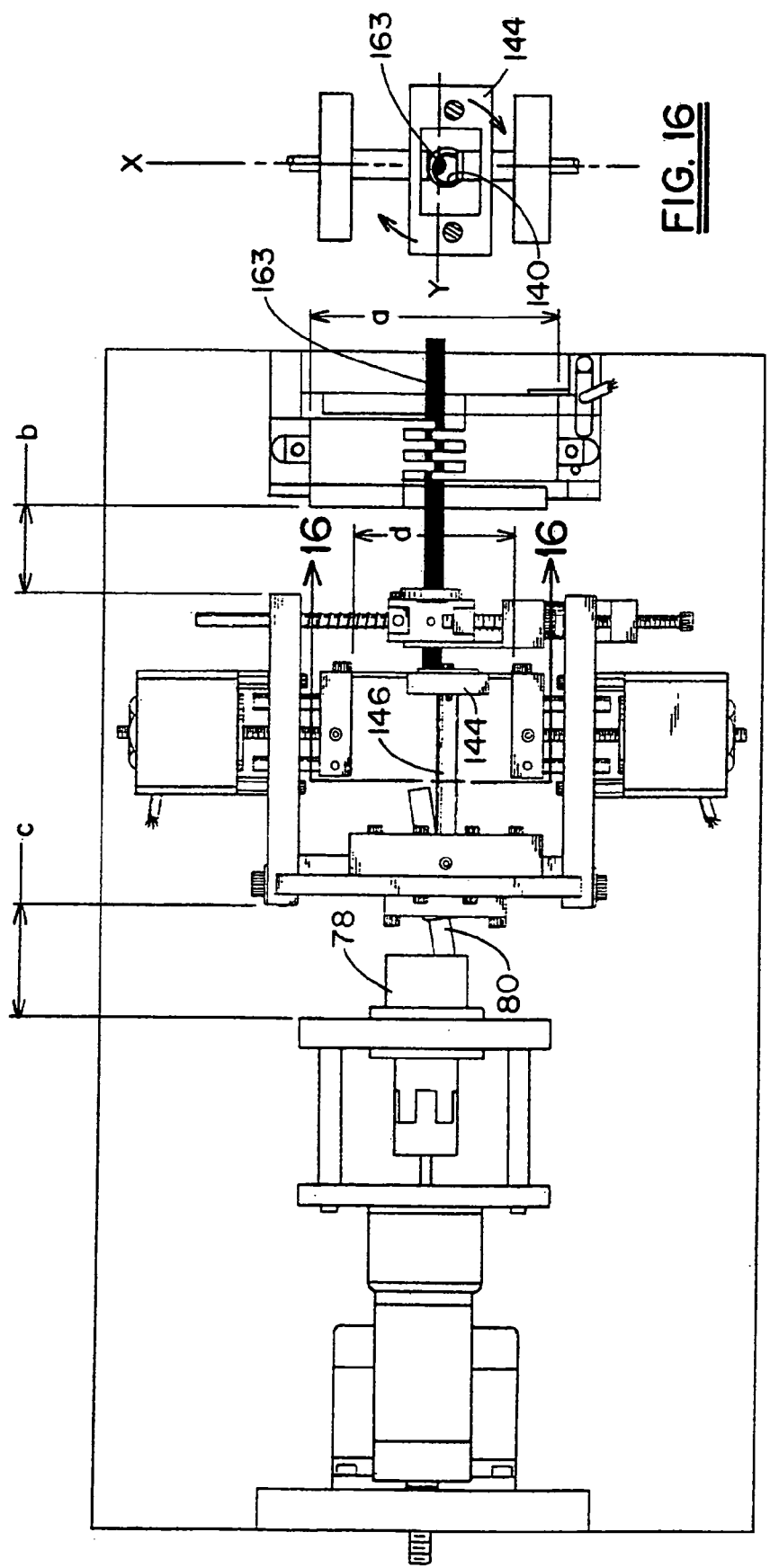

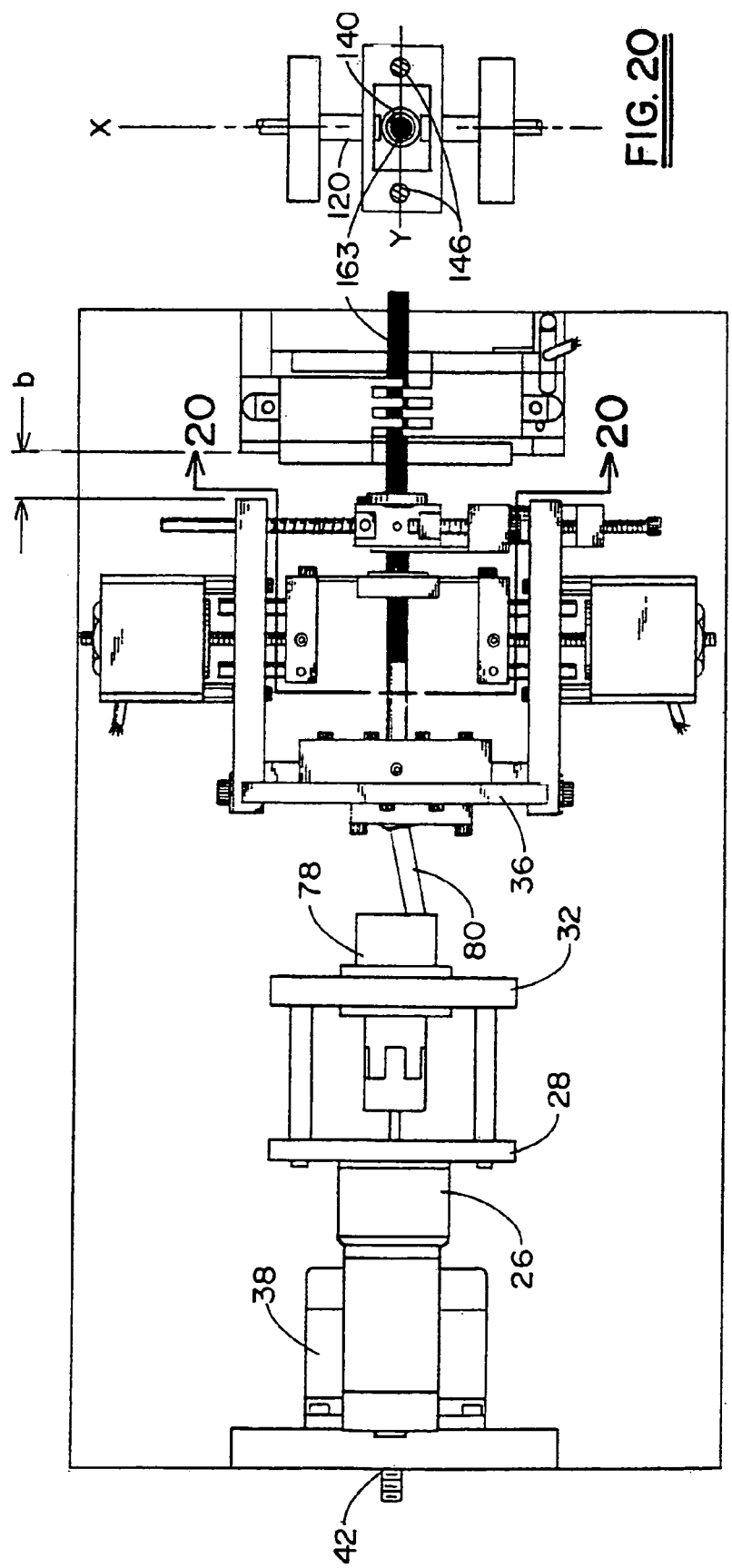

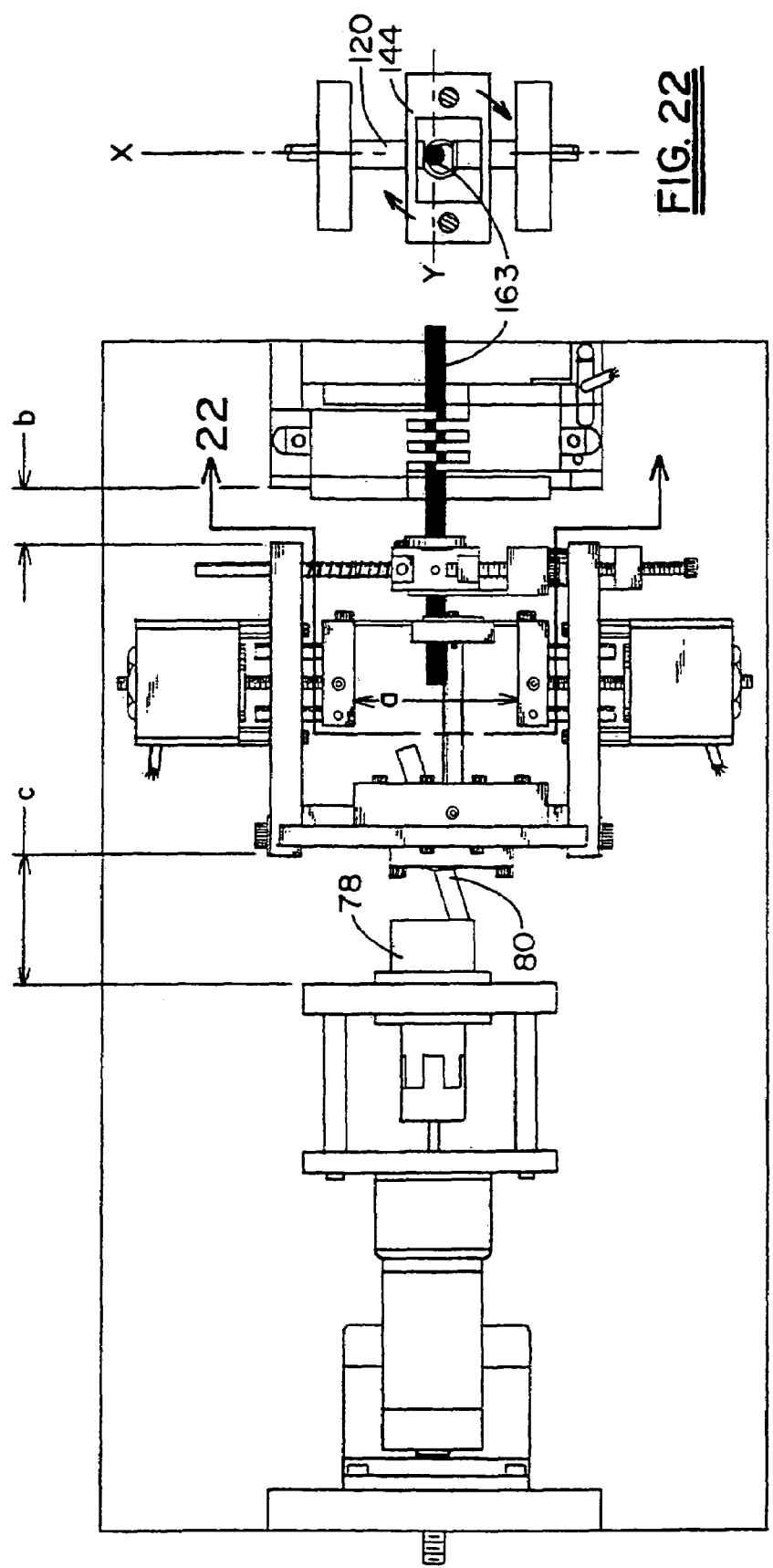

APPARATUS AND METHOD FOR CUTTING AND STRIPPING COVERING LAYERS FROM A FILAMENTARY CORE INCLUDING BOTH ROTARY AND RECIPROCATING CUTTING BLADES

REFERENCE TO RELATED APPLICATIONS

This is a continuation-in-part of application Ser. No. 10/359,775, filed Feb. 5, 2003 now U.S. Pat. No. 6,840,147 which is a division of application Ser. No. 09/640,843, filed Aug. 16, 2000, now U.S. Pat. No. 6,588,302 B1.

BACKGROUND OF THE INVENTION

The present invention relates to apparatus and methods of severing and at least partially removing one or more covering layers on a filamentary core, such as an electrical wire, cable or optical fiber. More specifically, the invention relates to cutting/stripping apparatus, and methods of operation thereof, which include at least one first blade for rotary motion about the central axis of the workpiece, and at least two, second blades reciprocally movable along essentially linear axes, toward and away from the one another while remaining equally spaced on opposite sides of the central axis. In addition, the invention is directed to employment in apparatus which operates upon a succession of discrete workpieces, as opposed to more sophisticated apparatus capable of accepting a continuous supply of material (such as coated wire on a spool) and operating upon the material to form a succession of completed workpieces. The apparatus includes programmable, electronic control means with operator inputs to control parameters of the cutting/stripping operations; however, the invention is Parent U.S. Pat. No. 6,588,302 discloses what is generally termed wire processing equipment having a single blade with a circular cutting edge surrounding an opening in the blade through which the covered wire or workpiece extends. A discrete workpiece, such as insulated wire cut to a desired length, is inserted axially into the machine until the end of the workpiece contacts a stop which is provided, as in many other prior art machines, by the surface of the blade. The wire is then fixed in position by a pair of clamping jaws and the blade is moved to bring the end of the wire into registration with the opening in the blade. The blade is then moved axially of the wire to position the cutting edge in a plane spaced a predetermined distance from the end of the wire. The blade is then moved in a circular path to orbit the wire axis as it cuts through one or more covering layers, such as insulation, shielding, or other materials. The apparatus includes a pair of so-called "gripping members" having straight, parallel edge portions which are moved by respective stepper motors toward and away from the workpiece axis to "forcibly engage" the outer layer thereof either before or after the blade has cut through the layer about its entire periphery. After the rotary cutting operation, and after engagement of the coating layer by the gripping members, the blade and gripping members are jointly moved axially of the wire to at least partially remove the severed portion, or slug, from the workpiece. The apparatus is programmable to receive operator inputs specifying the length of cut (i.e., the distance from a terminal end of the workpiece to the plane of rotary severing of the outer layer), the depth of cut (i.e., the radial distance from the outer surface of the covering layer to the terminus of the rotary cut), and, if desired, other operational parameters.

The apparatus of the parent patent thus provides a clean and complete cut, with precise dimensional control, of the outer layer of the workpiece and, with the assistance of the gripping members, permits efficient removal or partial removal of the severed slug. However, some wire processing operations do not require cutting of the outer layer about its entire periphery. For such operations it is sufficient that two blades (or more, if desired) move toward one another from opposite sides of the workpiece, severing the outer layer to the desired depth in portions of its periphery, and then move axially to complete the severing operation and remove the slug. Such apparatus usually operates faster, is easier to set up and is less expensive than the apparatus which cuts through the layer about its entire periphery. Therefore, most organizations which routinely process a wide variety of wires and cables, from easy-to-strip PVC hookup wire to those having harder and stronger layers such as Teflon, Kapton, Tefzel, as well as multi-layered cables such as coaxial cables, must purchase at least two types of machines for their production requirements. Obviously, this can become very costly.

Another type of wire processing apparatus is that known as "measure-cut-strip" equipment wherein wire or cable is taken from an essentially continuous supply, as from an appropriately supported spool, a fed axially into the apparatus which automatically proceeds to eject a succession of finished workpieces, cut to a desired length, with one or more covering layers cut to their respective thickness, each at a desired axial length from the end of the wire, and fully or partially stripped from the underlying layer. Although the aforementioned cutting and stripping is usually performed entirely by blades moving linearly toward and away from the axis of the workpiece, rotary cutting blades have been added, as a separate item or as an optional inclusion in the measure-cut-strip equipment itself. However, when rotary cutting capability is provided, it is used only to cut through covering layers and not through the entire workpiece, and is not capable of assisting in slug removal, as in the machine of the parent patent. Also, in measure-cut-strip apparatus having both rotary and linearly moving blades, the cutting planes of the two types of blades are not closely adjacent one another, but are offset along the axis of the workpiece by an appreciable distance. Measure-cut-strip equipment is both structurally and electronically sophisticated, typically costing many times the price of apparatus designed to accept and operate upon a succession of pre-cut wires or cables. For purposes of distinguishing the two different types of equipment, that to which the present invention relates will be termed "end stripping" equipment.

SUMMARY OF THE INVENTION

The present invention is directed to improvements in such apparatus which provide, in a single machine, the capability of processing several types of wires and cables in the manner most direct and efficient for that type of workpiece. The general structure of the apparatus may be, and is described in the context of, that of the parent patent, with a single, orbiting blade to provide cutting of the outer layer about its entire periphery and a pair of members movable toward and away from one another to engage the outer layer. The pair of members may have linear, opposed edges, as in the apparatus of the parent patent, or may have V-shaped or radiused (curved) cutting edges, as will be described later herein. In any event, the electronic controls and software, together with selective operator inputs which define operation of the apparatus, permit cutting the outer layer of the workpiece by either the rotary blade or the reciprocating blades. In the latter case, the rotary blade may be rendered motionless, or may move while remaining out of contact with the workpiece, as the reciprocating blades are moved to cut through a portion of the outer layer. The rotary and reciprocating blades may, of course, be used in the manner of the parent patent, i.e., the rotary blade may cut entirely about the periphery of the outer (and, if desired, other) layer(s) of the workpiece with the reciprocating blades moved to forcibly engage the severed layer(s) to assist in the stripping operation. It is also within the capabilities of the apparatus for either the rotary or the reciprocating blades to cut entirely through the workpiece. Also, as the parent patent discloses, the parallel planes of the rotary and reciprocation blade edges are closely adjacent one another.

FIG. 1 is a partially diagrammatim, perspective view of a preferred embodiment of the invention;

FIG. 2a is a fragmentary, top plane view, partly in section, of portions of the apparatus within the circled area of FIG. 2 denoted "FIG. 2a."

FIG. 2b is a front elevational view on the line 2b—2b of FIG. 2a;

FIGS. 4 and 5 are front and rear end elevational views, respectively;

FIG. 6 is a fragmentary, rear elevational view of a portion of the apparatus taken on the line 6—6 of FIG. 2;

FIG. 7 is a front elevational view taken on the line 7—7 of FIG. 2;

FIG. 7a is a front elevational view, as seen in FIG. 7, with certain elements shown in an alternative position;

FIG. 8 is a side elevational view of the assembly of FIG. 7 with portions shown in phantom lines in the alternative position of FIG. 7a;

FIG. 9 is a perspective view of a special element used in calibration of certain portion of the apparatus;

FIG. 10 is a front elevational view in section on the line 10—10 of FIG. 2;

Figure 12:
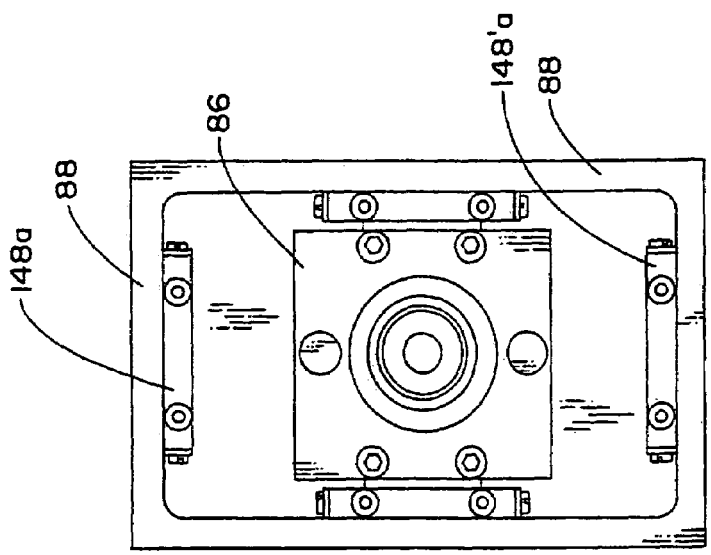
FIGS. 11 and 12 are top plan and side elevational views, respectively, with portion broken away, of the elements of FIG. 10.
Figure 11A:
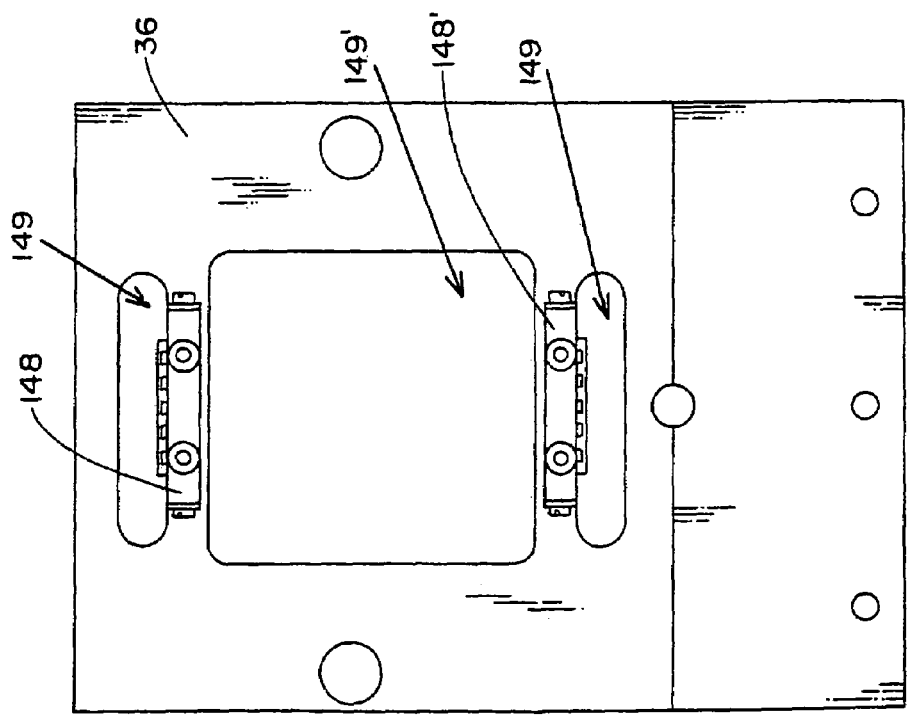
Figure 25:
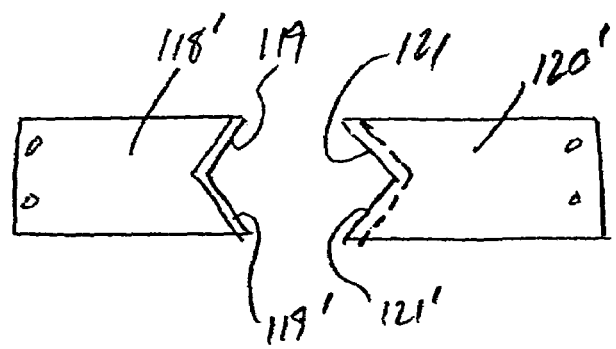
Figure 26:
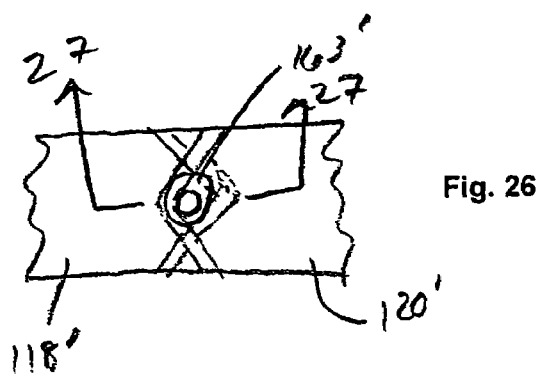
Figure 27:
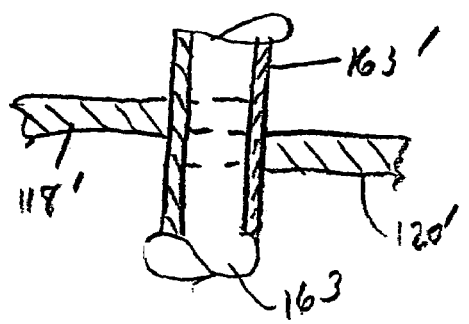

FIGS. 11a and 12a are elevational views in section on the lines 11a—11a and 12a—12a, respectively, of FIGS. 11 and 12;

FIGS. 13–24 are a series of views illustrating relative positions of certain movable elements of the apparatus at consecutive stages in the processing of a cable, the odd numbered Figures being top plan views and the even numbered Figures being fragmentary, elevational views taken on the liens indicated by the number of the even numbered Figures on the next preceding odd numbered Figure;

FIG. 25 is an elevational view of an alternate form of a pair of members shown in preceding Figures;

FIG. 26 is an elevational view of the members of FIG. 25 in engagement with a workpiece:

FIG. 27 is a top, plan view, in section on the line 27—27 of FIG. 26; and

Figure 28:
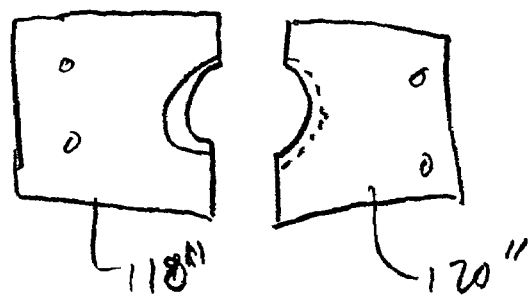

FIG. 28 is an elevational view of another version of the pair of members.

DETAILED DESCRIPTION

The apparatus of the invention, in the illustrated embodiment, is denoted generally by reference numeral 10. Apparatus 10 would, of course, be enclosed in an appropriate housing to prevent manual contact with moving parts, provide for insertion and withdraw of workpieces, scrape removal, etc. However, since the design of the housing plays no part in the present invention, it is omitted from the drawings. The fixed frame of the apparatus includes horizontal plate 12, resting on feet 13 and having open, cutout area 14 at what is considered the front end of the apparatus, front, vertical supports 16, 16' on opposite sides of open area 14, and rear, vertical support 18. Guide ways 20 are fixedly attached to the upper surface of plate 12 for sliding engagement by first and second carriages 22 and 24, respectively. For optimum rigidity and stability, the carriages are mounted to the ways via recirculating, linear, ball bearings pre-loaded to essentially remove play. DC motor 26 is mounted, via plate 28 and rods 30, 30', upon vertical support plate 32 for horizontal, reciprocating movement with first carriage 22.

Assembly 34, including the mounting and motion transmission elements for the cutting blade, gripper members, cable guide bushing and other elements described later, is mounted upon vertical support 36 of second carriage 24 for movement therewith. Stepper motors 38 and 40 are fixedly mounted to support 18 of the fixed frame and support 32 of the first carriage, respectively. Lead screw 42 is threadedly engaged with the rotatable nuts of motors 38 and 40 and with a threaded opening in support 36, and extends with clearance through openings in supports 18 and 32. Optical switches 44 and 45 are fixedly mounted to plate 12, for purposes described later. Electrical power and control boxes are diagrammatically represented in FIG. 1 by boxes 46 and 48, respectively, for operation and control of the automated functions of apparatus 10, as described hereinafter.

Figure 1A:
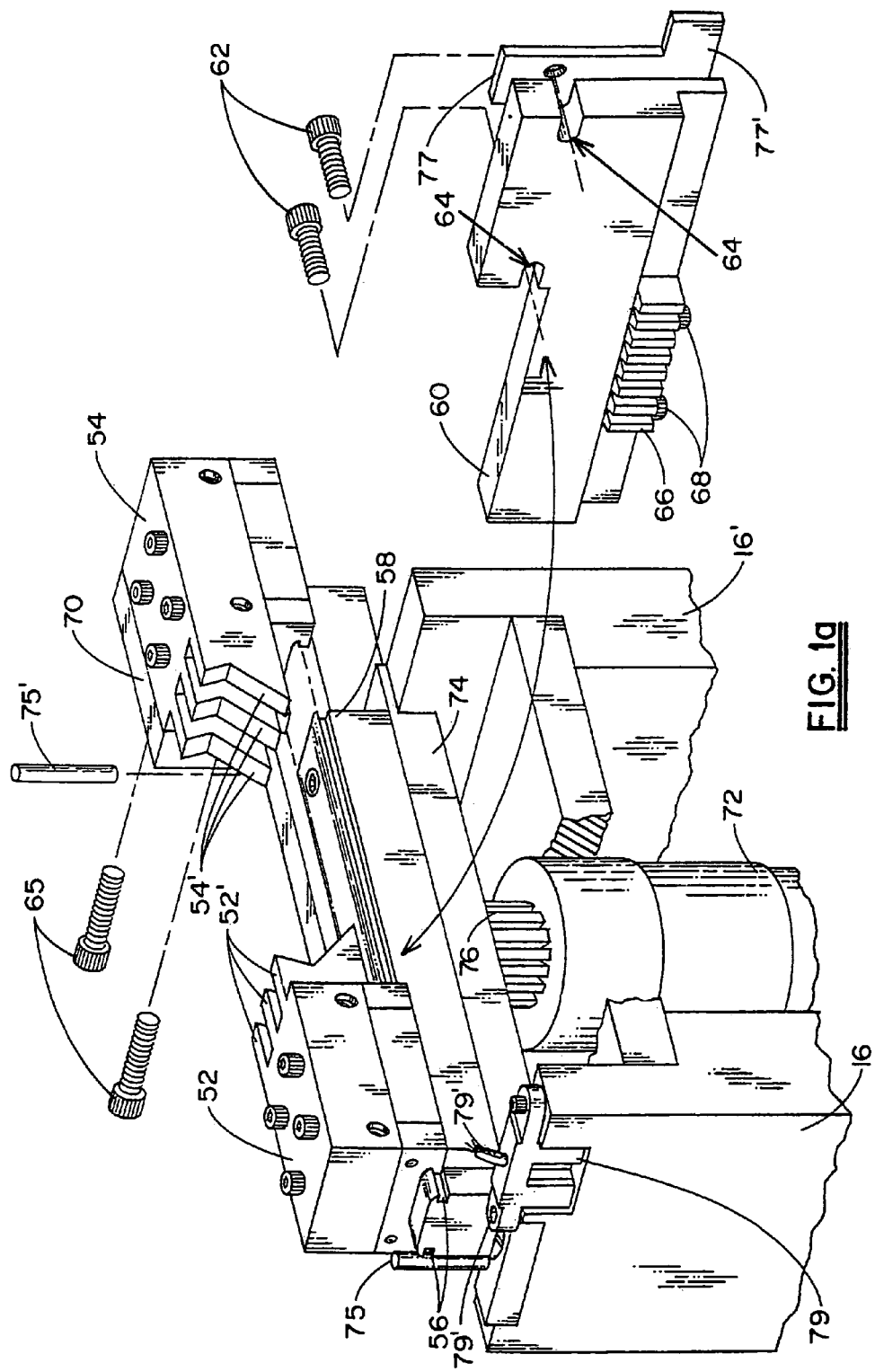
FIG. 1a is a partially exploded, perspective viwe of the portion of the apparatus within the circled area of FIG. 1 denoted "FIG. 1.

Clamping jaw assembly 50, elements of which are shown in more detail in FIG. 1a, is mounted upon fixed supports 16, 16' at the front end of apparatus 10. Jaws 52 and 54 each have a plurality of V-shaped engagement faces 52' and 54', respectively. The bases of the two jaws include inwardly facing tracks for sliding engagement with grooves 56 on the same fixed support 58. Plate 60, shown rotated away from its normal position, is adjustably fixed to the front side of jaw 52 by Allen-head screws 62 extending through open-ended slots 64. Plate 60 carries a linear gear rack comprising teeth 66, affixed to plate 60 by screws 68. Plate 70 is adjustably affixed to jaw 54 by screws 65 in the same mariner as plate 60 with respect to jaw 52 and carries a gear rack with teeth (not shown) identical to teeth 66. DC motor 72, supported on plate 74 between fixed frame supports 16, 16' is actuable to rotate pinion gear 76 in opposite directions. Teeth 66 of plate 60 and the corresponding teeth of plate 70 are engaged with front and rear sides, respectively, of pinion 76 for reciprocating, linear movement of jaws 52 and 54 toward and away from one another to engage and release a cable placed between engagement faces 52' and 54'. The outer limits of movement of jaws 52 and 54 are constrained by pins 75, 75'. Plate 77, having leg 77', is mounted by one of screws 62 on the front side of plate 60. Optical switch 79, of a conventional type having spaced beam and detector elements, is mounted on support 16 and connected to the microprocessor by wires 79'. As jaws 52 and 54 are moved to their outer positions, leg 77' interrupts the beam of switch 79, electronically confirming movement of the clamping jaws. As explained later, the radial position of the cable axis is established and maintained relative to the cutting blade by a guide bushing close to the blade, but it is desirable to calibrate the positions of jaws 52 and 54 relative to a desired radial position of the central axis of a cable clamped therebetween, at least approximately. This operation is quickly and easily performed by loosening screws 62 and 65, placing a metal rod at the desired centering position between engagement faces 52' and 54' and manually pushing jaws 52 and 54 toward one another, without movement of plates 60 and 70 until the engagement faces contact the rod. The rod may be centered by being inserted in the cable guide bushing, or by other means. Screws 62 and 65 are then tightened, engaging the racks on plates 60 and 70 with pinion 76 with the jaws centered to acceptable accuracy.

Figure 2:
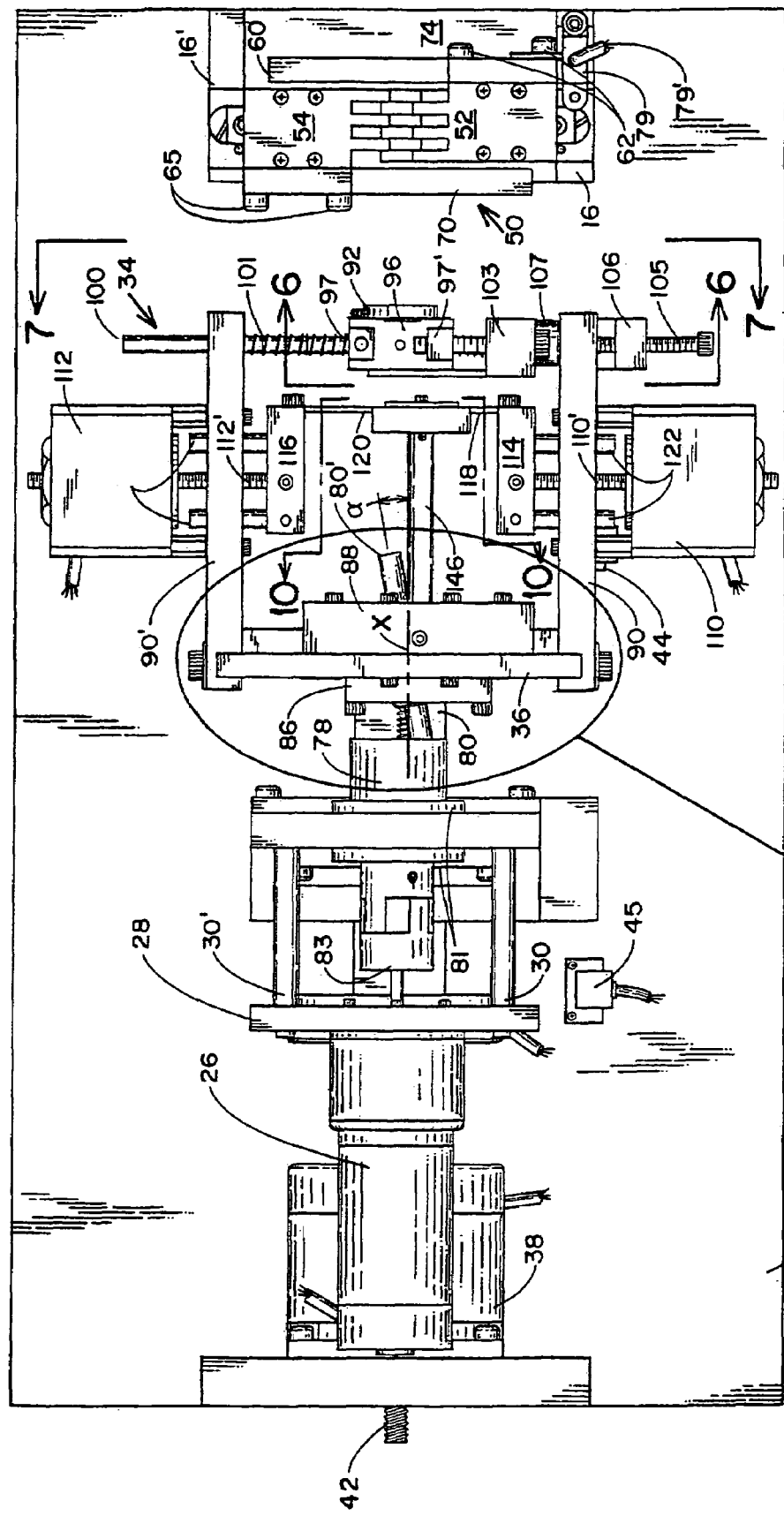
FIG. 2 is a top plan view of the apparatus of FIG. 1.
Figure 3:
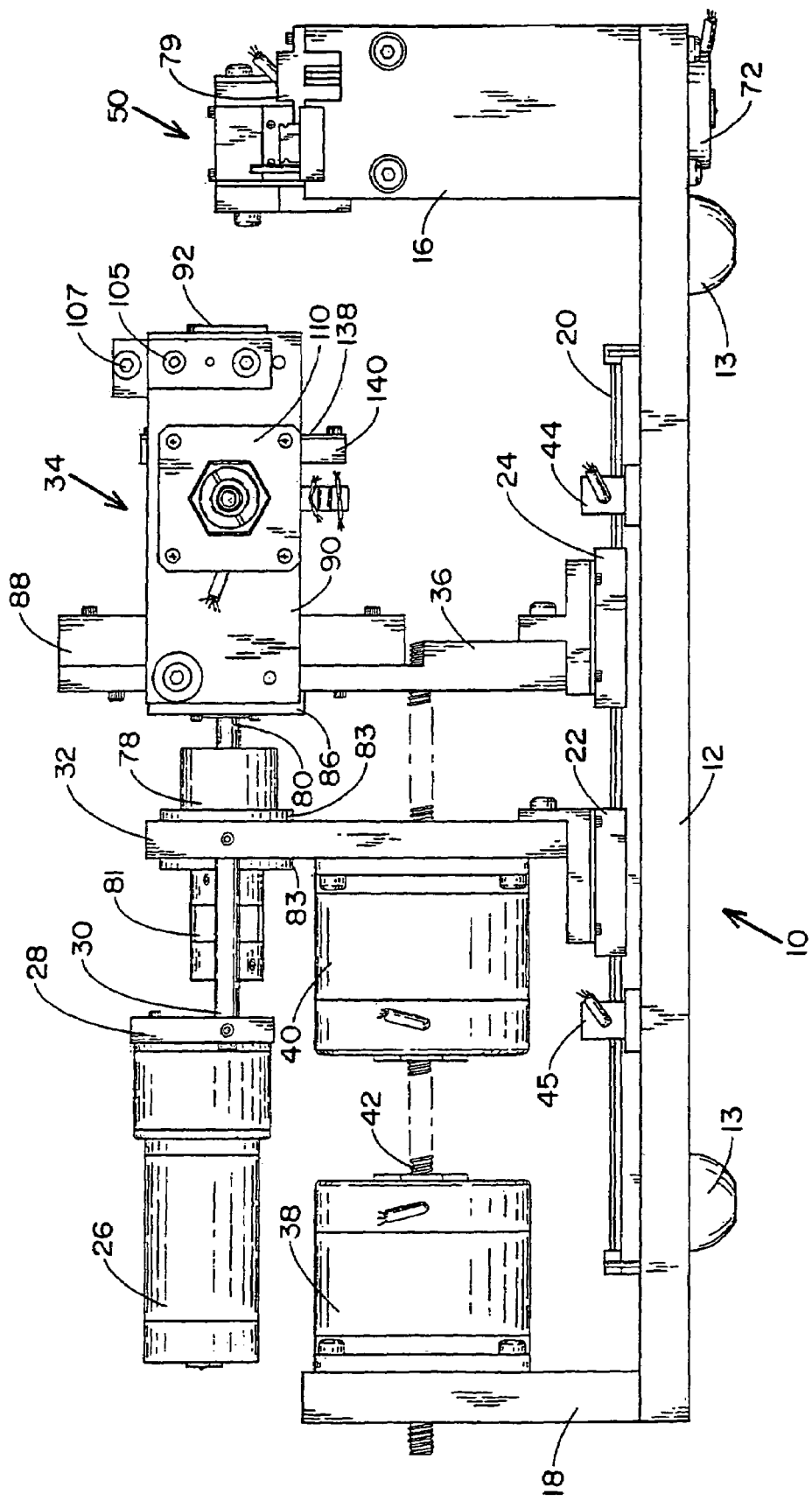
FIG. 3 is a side elevational view of the apparatus.
Figure 4:
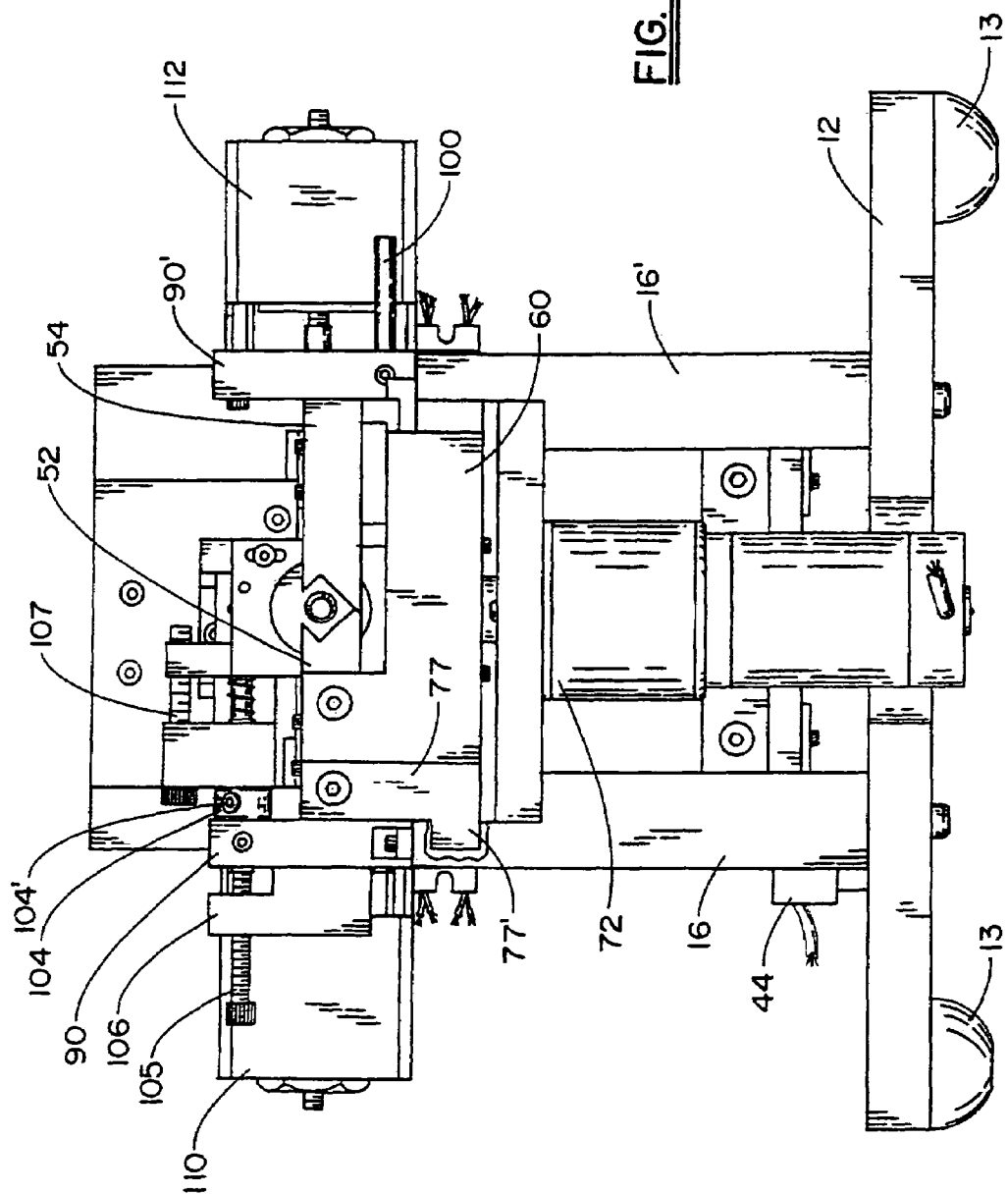

Cylindrical member 78 is considered the output shaft of motor 26, being connected directly to the motor by resilient coupling 81 (or by a timing belt) and extending through double row-ball bearing 83. Elongated rod 80 is fixedly attached at one end to shaft 78, as by force fit in a cavity in the end of the shaft, at a position offset from the central axis of shaft 78, and extends to free end 80'. The axis of rod 80 is at an acute angle (indicated in FIG. 2 as angle "a") to the central axis of shaft 78 and the two axes intersect at a point forwardly of the end of shaft 78 (indicated in FIG. 2 as point "X"). Rod 80 extends through pre-lubricated bearing 85, pressed into spherical bearing 82, captured in bearing holder 84 which in turn is mounted in plate 86, as best seen in FIG. 2*a*. A forward portion of plate 86 extends through an opening in plate 36 and is mounted to plate 88, which in turn is mounted to plate 36, in a manner described later. Actuation of motor 26 to rotate output shaft 78 produces nutational motion of rod 80 with points along the central axis of rod 80 orbiting the central axis of shaft 78 except at the point of intersection of the axes of shaft 78 and rod 80 (point X). The radius of the orbital path is in direct proportion to the distance, forwardly or rearwardly, from point X to any given point on the rod axis. Further details of the structure and interconnection of the elements associated with transfer of motion from motor 26 to the cutting blade will be provided later herein.

Other portions of assembly 34 are carried by arms 90, 90', affixed to and extending forwardly from plate 36. One such portion, a subassembly concerned with establishing and maintaining the radial position of the cable axis accurately centered with respect to the cutting blade is best seen in FIGS. 6–8. Guide bushing 92 is removably retained by set screw 94 in bushing holder 96 which is supported for vertical, sliding motion upon bushing holder support 97. As the first step in a cable processing operation, the end of the cable to be processed is advanced axially between jaws 52 and 54 and through central opening 98 of bushing 92. The bushing and cable do not rotate relative to one another during processing, thus eliminating any heating and expansion of the cable due to friction. This makes possible the use of bushings having openings with a diameter as little as 0.002" greater than that of the cable being processed with corresponding improvement in centering of the cable axis relative to the orbital axis of the blade.

Other advantageous features of the guide bushing arrangement are evident in the illustrations of FIGS. 2 and 6–8. Included among these are a design permitting movement of the guide bushing and its related mounting structure between an operative position with the guide bushing positioned close to the cutter blade and an inoperative position providing full access to the front of the blade, as well as structure permitting limited adjusting movement in both horizontal and vertical directions of the radial position of the guide bushing axis for precise centering thereof relative to the blade cutting edge axis. Rod 100 extends through and is axially restrained in openings in arms 90 and 90', and extends slidingly through a passageway in bushing holder support 97. Spring 101 is installed on rod 100 between arm 90' and support 97 to bias the latter toward the left, as seen in FIG. 7. Rod 102 is fixedly secured at one end to support 97 and extends loosely through an opening in bracket 103 and into an opening in arm 90. Collar 104 is installed on rod 102 between bracket and arm 90 and adjustably fixed in a desired axial position by set screw 104'. Collar 104 provides a stop against arm 90, defining the limit of movement due to the biasing force of spring 101.

Adjustment screw 105 extends threadedly through an opening in bracket 106 which is affixed to arm 90, and the end of the screw engages the end of rod 102 for axial movement thereof in response to rotation of screw 105. Adjustment screw 107 extends loosely through an opening in bracket 103 and is threaded through an opening in projecting portion 97' of bushing holder support 97. It will be noted in FIG. 6 that bracket 103 has at one end slot 103' extending angularly between horizontal and vertical. Pin 96' extends rearwardly from guide bushing holder 96 through slot 103'. Spring 108 (FIG. 7) is installed around rod 102 and biases bracket 103 into contact with the head of screw 107. Bushing holder 96 and support 97 may be manually moved to the right, as seen in FIG. 7, against the bias of spring 101, sliding on rod 100. Rod 102, bracket 103, collar 104 and adjustment screw 107 will move, together with the bushing, holder and support, until rod 102 is fully removed from the opening in arm 90. All of the moved elements may then be rotated about rod 100 in the direction of arrow 109 to the inoperative position shown in FIG. 7*a* and in phantom lines in FIG. 8. This provides full, unobstructed access to the cutting blade for removal and replacement thereof. Spring 101 biases the rotated elements to the left in the inoperative position and, when returned to the operative position, all elements will be in their original positions due to contact of collar 104, acting as a stop defining the limit of leftward movement, with arm 90.

The arrangement also permits adjustment of the radial position of the guide bushing axis in both the X (horizontal) and Y (vertical) directions over the limited ranges indicated in FIG. 7. Rotation of adjustment screws 105 and 107, as indicated by the arrows in FIG. 8, together with the action of springs 101 and 108, will result in movement of the bushing axis in the X and Y directions, respectively. Rotation of screw 107 causes horizontal movement of bracket 103 which translates, through angled slot 103' and pin 96', to vertical movement of bushing holder 96, sliding in support 97. Locating the ideal position of the axis may be performed by manually rotating shaft 68 while looking through bushing opening 98. The position of the axis is adjusted to make the orbital path of the blade opening visually concentric with the central axis of the bushing opening. A cable is then inserted through the bushing, the outer layer is cut and stripped, and the cable is removed and visually inspected for concentricity of cut. Any necessary fine adjustment of the position of the bushing axis may then be made. Although extremely accurate positioning may be obtained by automated means, for example, opto-electronic means with positional feedback, the described manual adjustments with "eyeballing" of relative positions of bushing and blade axes together with "trial-and-error" cuts, provide acceptable calibration for virtually all applications.

Stepper motors 110 and 112 are mounted on the outside of arms 90 and 90', respectively. Lead screws 110' and 112' are threadedly engaged with the rotatable nuts of stepper motors 110 and 112, respectively, and extend rotatably through openings in arms 90 and 90'. Blocks 114 and 116 are carried on the ends of lead screws 110' and 112', respectively. Gripper members 118 and 120 are mounted upon blocks 114 and 116, respectively. Stepper motors 110 and 112 are actuated to move lead screws 110' and 112' axially in opposite directions, thereby moving the opposed edges of gripper members 118 and 120 toward and away from one another. Reciprocal, linear motion of blocks 114 and 116 is established by sliding movement of rods 122 and 124 (FIG. 2) on the blocks moving slidingly through openings in arms 90 and 90', respectively.

Precise calibration of gripper members 118 and 120 to position the opposed edges thereof at equal distances from the axis of opening 98 in bushing 92, and thus equal distances from the central axis of a cable extending through the bushing opening, is provided by a unique combination of hardware and software. For this purpose, special bushing 126, shown in FIG. 9, is positioned in holder 96. This operation is carried out with the blade removed. Bushing 126 has no opening for passage of a cable, but rather a metal center pin 128, extending past the normal blade position and the plane of the opposed edges of gripping members 118 and 120. Pin 128 is electrically insulated by plastic body 130 from metal strip 132 which is connected to chassis ground by contact with set screw 94. Pin 128 and strip 132 are connected by wires 134 and 136, respectively, to an input port 137 of a microprocessor forming part of control box 48 (FIG. 1). One of stepper motors 110 and 112 is actuated in a step-by-step manner until the edge of the metal gripping member moved thereby touches pin 128, at which point pin 128 is also connected to ground potential, causing the microprocessor to note (store) the position of the gripping member, in terms of the number of motor steps from the central axis of the pin. The first gripping member is then moved away from pin 128 and the same steps are repeated for the other stepper motor and gripping member. One or both stepper motors are actuated as required to position the opposing edges of the gripping members at equal distances (an equal number of steps of their respective stepper motors) from the central axis. This calibration technique is much easier and more reliable than prior art, mechanical calibration procedures. It is useful to note that rods 146, 146' extend through blade holder 144 and terminate a short distance forwardly of the front surface of the holder. A pair of holes in blade 138 are provided above and below the opening defined by cutting edge 140 for passage of rods 146, 146'. The three holes in the blade are ground to quite precise tolerances and serve to position each blade mounted upon holder 144 with great accuracy and repeatability relative to both the holder and also to orbitally movable plate 86.

Referring now to FIGS. 10, 11,11a, 12 and 12a, the elements for mounting and moving the cutting blade will be explained in greater detail. Blade 138, having circular cutting edge 140, is mounted by screws 142, 142' upon blade holder 144. A pair of rods 146, 146' rigidly connect holder 144 to plate 86 for direct transmission of the previously described, orbiting motion of plate 86 to holder 144 and thus to blade 138. The orbiting motion is in planes perpendicular to the axis of the cable being processed, and thus in the plane of cutting edge 140. Plate 88 is mounted upon support plate 36 for horizontal movement relative thereto upon a first set of linear roller bearings or so-called rail sets. In this type of bearing, first and second halves of the bearing housing are mounted to the respective movable members. The housing halves are locked together by the bearings themselves so that the members cannot be separated but are relatively movable in the direction of the row of bearings. Housing halves 148 and 148' are seen in FIG. 11a, mounted upon plate 36. The complementary halves 148a and 148'a are seen in FIG. 12a, mounted upon plate 88. Open slots 149 in plate 36 are provided to facilitate assembly of plates 36 and 88. Plates 86 and 88 are mutually connected, through opening 149' in plate 36, for vertical movement relative to one another through slide sets comprising linear roller bearings in housings 150, 150' on plate 88 and complementary housings mounted by screws 150a (FIG. 2b) and 150a' on plate 86.

Referring again to FIG. 2b, rods 146, 146' are seen to extend from plate 86 through diametrically opposite, elongated slots 152, 152' which communicate with central opening 154 in plate 88 through which rod 80 extends. Thus, the vertical component of the motion of rod 80 is transmitted directly to plate 86, moving it vertically with respect to plate 88 upon bearings 150, 150' and moving rods 146, 146' vertically in slots 152, 152', respectively. The horizontal component of the motion of rod 80 is transmitted to both plates 86 and 88, moving the latter horizontally upon bearings 148, 148' relative to plate 36. The resulting orbiting movement of plate 86, rods 146, 146', holder 144 and blade 138 is a combination of the horizontal and vertical components of the nutational motion of rod 80, transmitted through the slide plates and bearings in the manner indicated. The use of crossed, linear, roller bearings in the mechanical motion transmission arrangement of apparatus 34 provides the important advantages of a more compact design, fewer wear parts, elimination of play by pre-loading of linear bearings with smoother, more accurate and rigid motion.

Figures 13, 14:
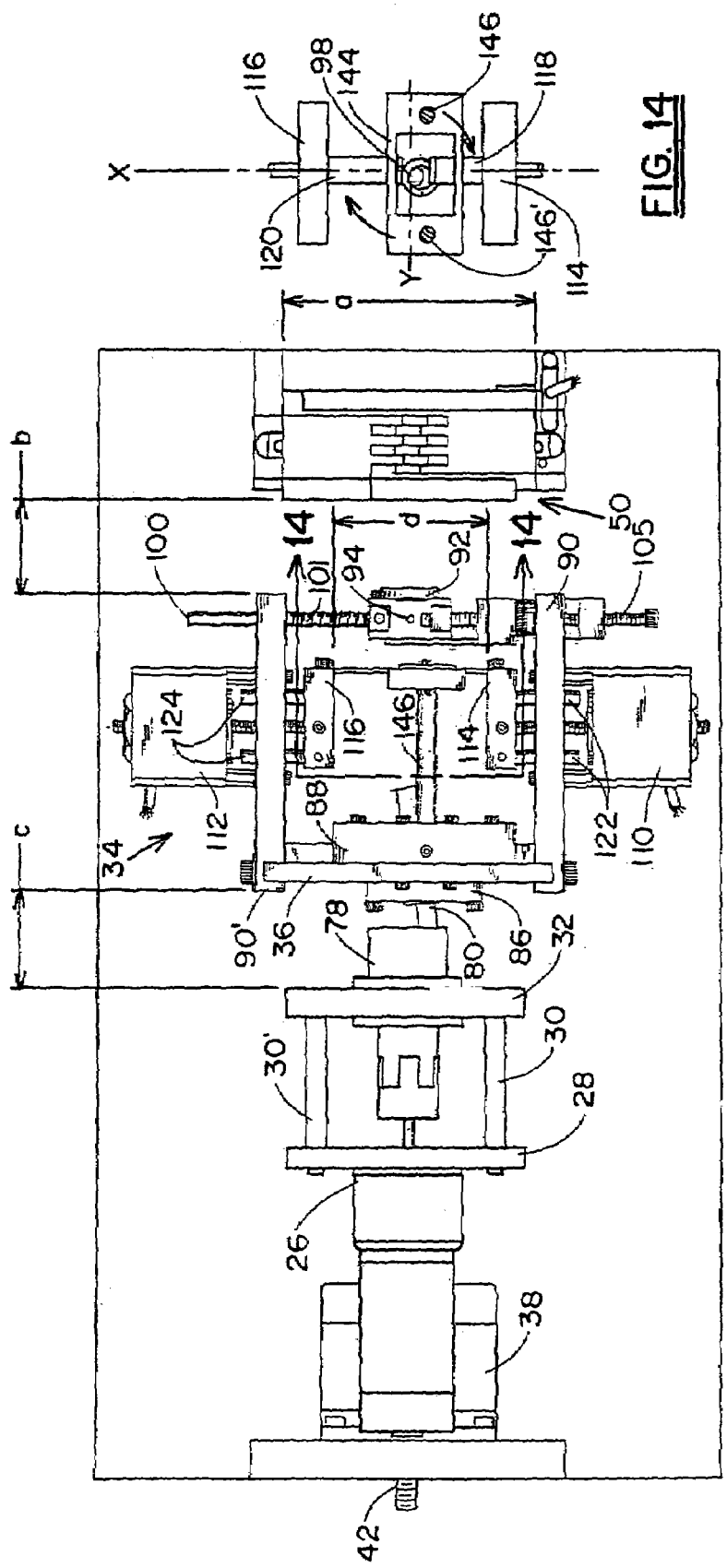

Referring now to the remaining Figures, i.e., FIGS. 13 through 24, the sequence of steps performed by apparatus 10 in cutting and stripping the outer layer from a coaxial cable having a plurality of layers in concentrically surrounding relation to a central conductor will be described. Prior to inserting the cable into the apparatus, the operator provides inputs through keypad 162 (FIG. 1) to the microprocessor of control box 48. LCD display 164 is also shown diagrammatically in FIG. 1, providing visual readout of the data inserted by the operator. The selective inputs include numerical values corresponding to the radial depth and axial length of each cut to be made, and may include other instructions, as explained later. The "ready" or "home" position of the movable elements, prior to insertion of the workpiece, is illustrated in FIGS. 13 and 14. The elements are in this position at the conclusion of each cable processing operation, and thus at the beginning of the next operation, when apparatus 10 is powered up. The jaws of clamping assembly 50 are in the open or separated position with the outer surfaces spaced by distance a; carriages 22 and 24 are positioned at the forward and rearward ends of their travel, respectively, with the forward ends of arms 90, 90' spaced from the opposing surface of the clamping assembly by distance b; and the forward surface of plate 32 spaced by distance c from the rear ends of arms 90, 90'; blocks 114 and 116 are in their outermost positions, spaced by distance d. This home position of the elements is pre-programmed into the microprocessor and is not under control of the operator performing the cable processing. After completing the keypad operations, the cable is manually advanced by the operator between the clamping jaws and through the opening in the guide bushing until the end of the cable abuts the cutting blade (it will be noted that the blade opening surrounded by the cutting edge is not axially aligned with the guide bushing opening in the home position of the elements). The operator then presses the "start" button or pad and sequential steps proceed under control of the microprocessor, as follows:

Step 1: Reference FIGS. 15 and 16. The cable, shown as a solid black line denoted by reference number 163, has been inserted and motor 72 has been actuated to move the clamping jaws into contact with the cable. Although a portion of the end of the cable is seen in FIG. 16, the offset axes of guide bushing 92 and cutting edge 140 cause at least a portion of the cable end to abut the forward surface of blade 138. Other elements remain in the home position. One of the instructional inputs (i.e., other than the numerical inputs indicating depths and lengths of cuts) into keypad 162 is the clamping force exerted on cable 163. This is a function of motor torque which is directly proportional to the current supplied to the motor. Thus, if the same current is applied the clamping force will be the same regardless of cable diameter. As a further refinement, the magnitude of the current may be varied at certain times in the cutting and stripping operation. Since very little axial force is applied to the cable except when the slug is being pulled away, current may be kept at a low level at all times other than during stripping, at which time it is increased to hold the cable more firmly, and returned to the lower value thereafter. This feature effectively prevents motor overheating and prolongs motor life.

Figures 17, 18:
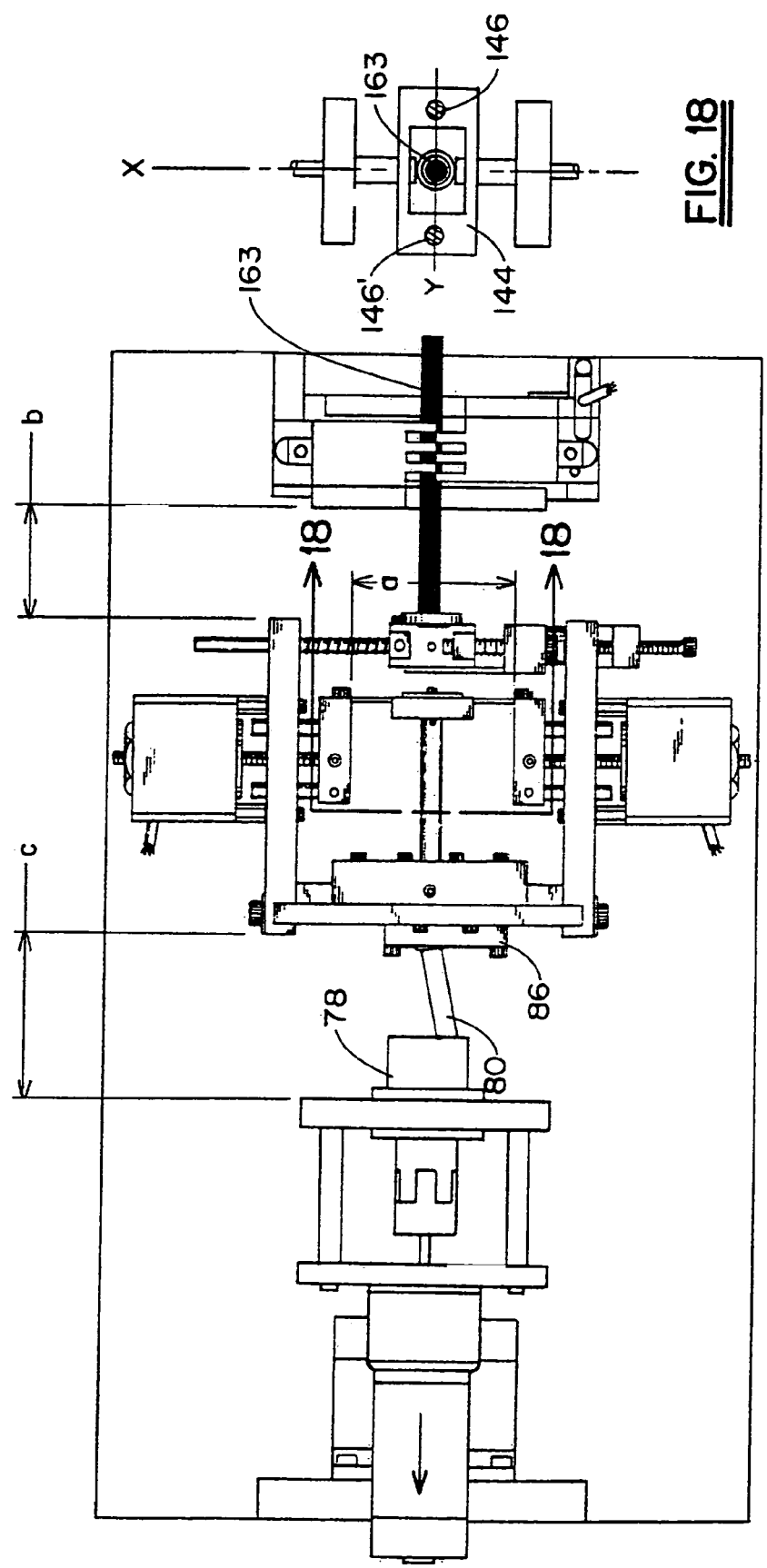
Figures 23, 24:
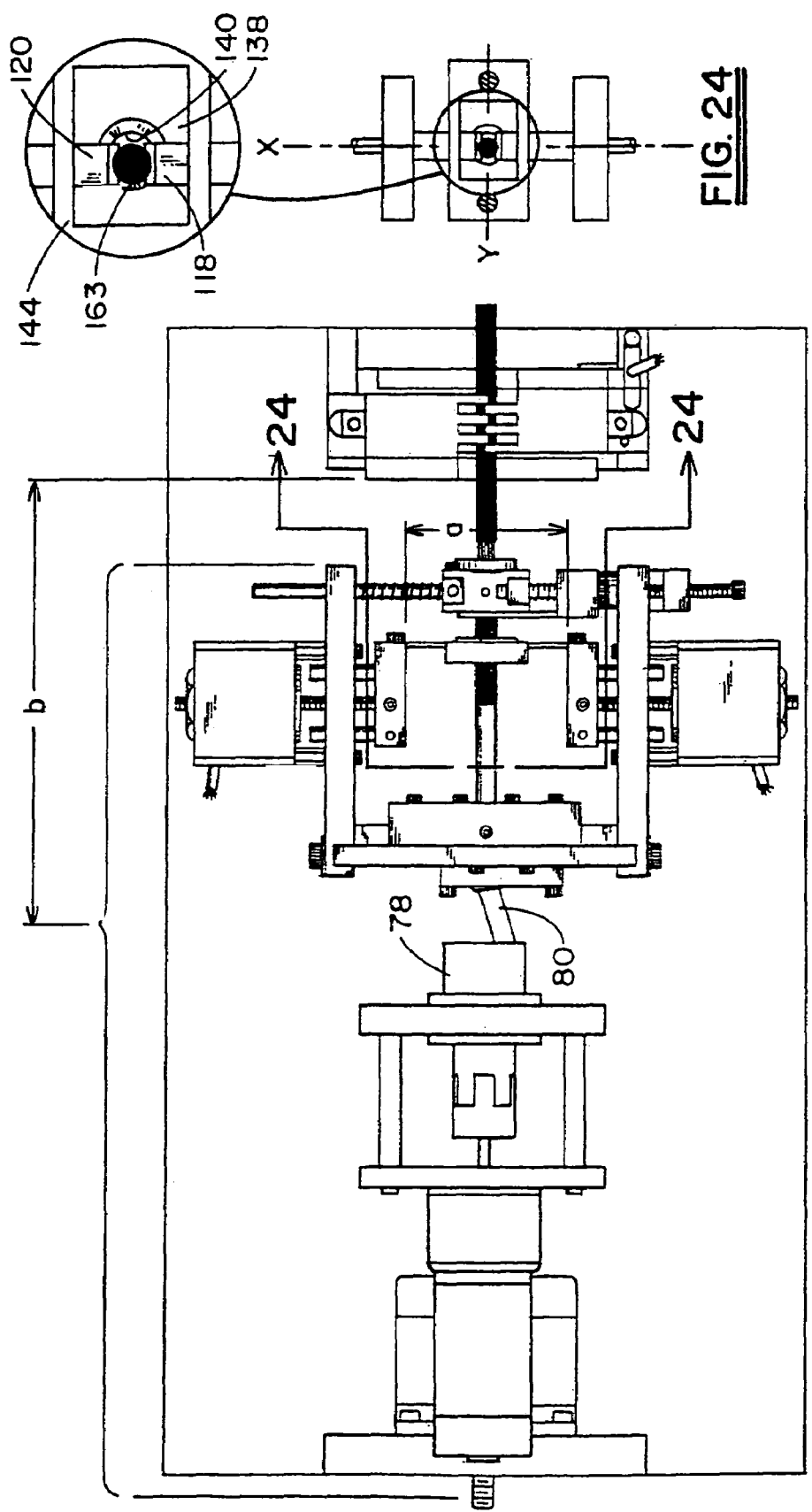

Step 2: Reference FIGS. 17 and 18. Stepper motor 40 is actuated while stepper motor 38 is not, i.e., the nut of stepper motor 38, which is anchored to the fixed frame, is locked while the nut of motor 40 is rotated. Lead screw 42 remains stationary while stepper motor 40 and carriage 22 move rearwardly, thereby increasing reference distance c. Rod 80 is pulled rearwardly through bearing 82, shifting the position of plate 86. The number of steps motor 40 is actuated during this step is the same for each operation, being the number of steps necessary to move plate 86, and thus rods 146, 146', blade holder 144 and blade 138, to a position wherein the blade opening surrounded by cutting edge 140 is concentric with the axis of cable 163, as seen in FIG. 18.

Step 3: Reference FIGS. 19 and 20. Stepper motor 38 is actuated while stepper motor 40 is not, i.e., the nut of stepper motor 40, which is mounted to plate 32 of first carriage 22, is locked while the nut of motor 38 is rotated. Since motor 38 is mounted to the fixed frame, lead screw 42 is moved axially forward, moving carriages 22 and 24 in a forward direction together with all the elements carried thereon. This advances the blade axially with respect to the end of the stationary cable, reducing reference dimension b with cable 163 extending concentrically through the blade opening. The number of steps for which motor 38 is actuated is the number necessary to position the plane of the blade cutting edge at a distance from the free end of the cable corresponding to the axial length of the first cut.

Step 4: Reference FIGS. 21 and 22. Motor 26 is actuated to rotate output shaft 78 and rod 80, thus producing the previously described orbiting motion of plate 86. Blade 138 orbits cable 163, as indicated in FIG. 22. The radius of orbital motion, as determined by reference distance c, i.e., the position along its axis at which rod 80 engages bearing 82, produces a depth of cut equal to the thickness of the outer layer of cable 163, as programmed into the microprocessor by the operator.

Step 5: Reference FIGS. 23 and 24. Motor 26 is deactuated, stopping orbital motion of blade 138. Stepper motors 110 and 112 are actuated to move gripping members 118 and 120, respectively, toward one another until opposing edges of the gripping members engage the outer layer of cable 163 at a position very close (a slight distance toward the rear of apparatus 10) to that at which the outer layer has been severed by cutting edge 140. The number of steps for which motors 110 and 112 are actuated is determined by the microprocessor in accordance with cable diameter and depth of cut information which is inserted by the operator prior to commencing processing of the cable. As seen in the enlarged portion of FIG. 24, the outer layer of cable 163 is engaged by blade 138 at a position adjacent the cutting edge indicated by reference numeral 140', and the slug (the portion of the outer layer between the cut and the terminal end) is engaged on opposite sides by opposing edges of gripping members. Thus, for stripping purposes, the slug is engaged at three points about its periphery. Current to motor 72 is increased to raise the clamping force exerted on the cable, as previously described. Stepper motor 38 is then actuated, moving lead screw 42 axially rearwardly, together with carriages 22 and 24. This movement, with cable 163 restrained against axial movement by clamping assembly 50, removes the slug from the remaining portion of the cable. The slug may fall by gravity, free of any moving parts since the stripping operation is performed at a position axially offset (forwardly) from the orbital drive components. Commercially available covers may be provided on the forward portion of ways 20 to insure that no debris is deposited thereon. The current to motor 72 is decreased to its original level and stepper motors 110 and 112 are actuated to move gripping members 118 and 120 back to their outward positions.

Step 6: Reference FIGS. 13 and 14. Following the stripping operation, the elements are returned to the home position, ready for movement through another series of steps to cut and strip a section of the next covering layer. Movement of the carriages to their home position is electronically confirmed by optical switches 44, 45 which are actuated by passage of shutters 44',45', fixedly mounted to carriages 22 and 24, respectively, between the beam and detector portions of the switches.

Another option in the programming of the microprocessor, either at the factory or by the operator, is to actuate stepper motors 110 and 112 to move gripping members 118 and 120 into engagement with the outer layer of the cable before actuating motor 26 to perform the cutting operation. This may be particularly advantageous for relatively long lengths of cut when the tendency of the end of the wire to "whip" due to forces imparted by the orbiting blade are greatest. Although the specific example shown herein employs linear stepper motors to move the gripping members, there is a multitude of options for effecting such movement including solenoids, gears, cams, etc. It is also emphasized that the stepper motors shown as providing power to move the elements axially and orbitally of the cable could be replaced by DC motors with the only significant design difference in the controls portion.

As mentioned in the preceding paragraph, the microprocessor may be programmed to bring the opposed edges of gripping members 118 and 120 into engagement with the workpiece before actuating motor 26 to move the rotary cutting blade to engage and cut the workpiece about its entire periphery. In fact, the microprocessor may be programmed, and, according to the present embodiment of the invention, is programmed to move the edges of the gripping members into engagement with the workpiece, extending into the workpiece by a distance which the operator has entered during the setup phase, as described in step 5 above. Stepper motor 38 is then actuated to move members 118 and 120 axially of the workpiece to break the layer of material at the plane of penetration of the gripping members and to strip the resulting slug from the remaining portion of the workpiece. This occurs without contact of cutting edge 140 with the workpiece, either by blade 138 remaining stationary (i.e., motor 26 is not actuated) or by blade being so positioned that its orbital motion does not bring the cutting edge into contact with the workpiece. In other words, the microprocessor is programmed so that all cutting and stripping is performed by the reciprocating blades (members 118 and 120).

Rather than the straight, parallel edges of members 118 and 120 shown in the preceding Figures, the opposing edges may be V-shaped, as shown in FIGS. 25–27. In fact, for many applications, these so-called V-blades, which are well known in the art, are preferred. The members denoted by reference numerals 118' and 120' each incorporate two cutting edges, those of member 118' being indicated by reference numerals 119 and 119', and those of member 120' being numbered 121, 121'. The sharp edges are formed by a bevel, i.e., a surface extending angularly between the major, parallel, front and rear surfaces of the blades. The beveled surface of blade 118' is on the side facing the viewer, while the beveled surface of blade 120' is on the opposite side. That is, the blades are placed with the surfaces bordering the cutting edges in contacting relation, as best seen in FIG. 27, thus allowing movement of the blades past the position wherein the apex of the two V-shaped edges are axially aligned to completely sever the workpiece in applications where this is desired. This is the usual, prior art arrangement of V-blades. Blades 118' and 120' are shown in FIGS. 26 and 27 with the cutting edges extending into covering layer 163' of workpiece 163. Relative axial movement of the blades and workpiece will cause the uncut portion of layer 163' to break and the resulting slug of the outer layer to be stripped from the central core of the workpiece.

FIG. 28 shows another type of prior art blade 118", 120", having curved or "radiused" cutting edges, which may be used in the wire processing apparatus of the present invention.

With appropriate software installed in the microprocessor, inputs provided by the operator allow selective use of either the blade which cuts in a rotary path around the entire periphery of the workpiece, or the blades which move linearly to cut through portion of the workpiece to perform the cutting operation. As previously mentioned, this allows processing of the workpiece to proceed in the manner best suited to the requirements of each operation. Of course, when a rotary cut is made, the linearly moving blades may still be used to assist in the stripping operation, as in the parent patent. The linearly moving blades may have cutting edges which are straight and parallel, as in the parent patent, or these may be readily replaced by V-blades or blades with radiused cutting edges. Further, the invention may be employed in machines wherein either or both of the rotary and linear blades are moved in an arcuate path about a common axis toward and away from the workpiece, as in other prior art end stripping apparatus, but for purposes of the present description such motion is considered essentially linear.

What is claimed is:

1. End stripping apparatus for cutting at least partially through a covering layer of a discrete, filamentary workpiece having a central axis at a predetermined axial position relative to a terminal end of said workpiece, said apparatus comprising:

a) means for fixing the positions of said central axis and of said terminal end;
b) first blade means having at least one cutting edge:
c) second blade means having at least two cutting edges;
d) first motive means actuable to move said first blade means rotationally of said workpiece to cause said at least one cutting edge to pass at least partially thorough said layer about the entire periphery thereof to at least one, first predetermined depth;
e) second motive means actuable to move said second blade means radially of said workpiece to cause said at least two cutting edges to move toward said central axis from opposite sides of said workpiece to pass at least partially through said layer to at least one, second predetermined depth;
f) third motive means for jointly moving said first and second blade means axially of said workpiece to position one of:
  i) said at least one cutting edge, and
  ii) said at least two cutting edges in position to cut at least partially through said layer at said predetermined axial position upon actuation of the corresponding one of said first and second motive means;
g) electronic operator input means for storing selected values of said predetermined position and said first and second predetermined depths; and
h) a programmable electronic control for actuating said first, second and third motive means to move said first and second blade means in conformity with said selected values.

2. The apparatus of claim 1 wherein said at least two cutting edges are in a substantially common plane.

3. The apparatus of claim 2 wherein said common plane is substantially perpendicular to said common axis.

4. The apparatus of claim 3 wherein said second blade means comprises a pair of blades each having V-shaped cutting edges.

5. The apparatus of claim 1 wherein said second blade means comprise a pair of blades each having a single, linear cutting edge.

6. The apparatus of claim 5 wherein said linear cutting edges are substantially parallel to one another and equally spaced on opposite sides of said central axis throughout movement of said pair of blades.

7. The apparatus of claim 1 wherein said second blade means comprise a pair of blades each having a singe, curved cutting edge.

8. The apparatus of claim 7 wherein said curved cutting edges are symmetrically positioned on opposite sides of said central axis throughout movement of said pair of blades.

9. The apparatus of claim 1 wherein said first, second and third motive means comprise linear stepper motors.

10. The apparatus of claim 9 wherein said second blade means comprises a pair of blades, and said second motive means comprise a pair of said stepper motors each actuable to move a respective one of said pair of blades.

11. The apparatus of claim 1 wherein said at least one cutting edge lies in a first plane, substantially perpendicular to said central axis and said at least two cutting edges lie in a common plane parallel to and closely adjacent said first plane.

* * * * *